US008185764B2

(12) United States Patent
Bobrek

(10) Patent No.: US 8,185,764 B2

(45) Date of Patent: May 22, 2012

(54) TECHNIQUES FOR ENSURING POWER DELIVERY OVER ONLY DATA-ACTIVE PAIRS OF DATA COMMUNICATIONS CABLING

(75) Inventor: Pavlo Bobrek, Bradenton, FL (US)

(73) Assignee: Cisco Technology, Inc., San Jose, CA (US)

( * ) Notice: Subject to any disclaimer, the term of this patent is extended or adjusted under 35 U.S.C. 154(b) by 483 days.

(21) Appl. No.: 12/252,533

(22) Filed: Oct. 16, 2008

(65) Prior Publication Data

US 2010/0100750 A1 Apr. 22, 2010

(51) Int. Cl.
*G06F 1/32* (2006.01)
*G06F 1/26* (2006.01)

(52) U.S. Cl. .......................... 713/324; 713/300; 713/320

(58) Field of Classification Search .................. 713/300
See application file for complete search history.

(56) References Cited

U.S. PATENT DOCUMENTS 5,994,998 A 11/1999 Fisher et al.
6,115,468 A 9/2000 De Nicolo
6,295,356 B1 9/2001 De Nicolo
6,473,608 B1 10/2002 Lehr et al.
6,587,454 B1 7/2003 Lamb
6,710,704 B2 3/2004 Fisher et al.
6,975,209 B2 12/2005 Gromov
7,053,501 B1 5/2006 Barrass
7,363,525 B2 4/2008 Biederman et al.
7,449,796 B2 * 11/2008 Elkayam et al. .................. 307/1
7,474,704 B2 1/2009 Lum et al.
7,567,579 B2 * 7/2009 Korcharz et al. ............. 370/401
7,681,052 B2 * 3/2010 Darshan et al. ............... 713/300
2004/0218324 A1 * 11/2004 Ferentz ........................... 361/90
2006/0244462 A1 * 11/2006 McCosh et al. ............... 324/522
2009/0235094 A1 * 9/2009 Diab et al. .................... 713/300
2010/0117808 A1 * 5/2010 Karam ..................... 340/310.16
2010/0171626 A1 * 7/2010 Darshan et al. ............... 340/660

OTHER PUBLICATIONS

IEEE Computer Society; "IEEE Std 802.3at-2009"; IEEE Computer Society; Part 3: Carrier Sense Multiple Access with Collision Detection (CSMA/CD) Access Method and Physical Layer Specifcations; Oct. 30, 2009; all pages.*
IEEE Computer Society; "IEEE Std 802.3af-2003"; IEEE Computer Society; Part 3: Carrier Sense Multiple Access with Collision Detection (CSMA/CD) Access Method and Physical Layer Specifcations; Jun. 18, 2003; all pages.*

* cited by examiner

*Primary Examiner* — Ryan Stiglic
(74) *Attorney, Agent, or Firm* — BrainwoodHuang

(57) ABSTRACT

A power delivery technique which involves connecting power sourcing equipment (PSE) with a powered device (PD) through data communications cabling (e.g., an Ethernet cable). The technique further involves negotiating an acceptable power level for the PD and a data rate for the PD, and enforcing delivery of power to the PD using only wire pairs of the data communications cabling which carry data between the PSE and the PD. As a result, the PSE does not deliver any power to the PD through wire pairs which are not data-active.

18 Claims, 4 Drawing Sheets

20
28
32
36
POWER SOURCING EQUIPMENT 22 CONSTRUCTED AND ARRANGED TO ENFORCE PoE POWER DELIVERY ONLY OVER DATA-ACTIVE WIRE PAIRS
28(1)
30
28(2)
34
28(3)
28(4)
26
POWERED DEVICE 24 (E.G. WIRELESS ACCESS POINT, IP PHONE, IP CAMERA, ETC)
MINIMUM ACCEPTABLE POWER REQUIREMENT 38

TECHNIQUES FOR ENSURING POWER DELIVERY OVER ONLY DATA-ACTIVE PAIRS OF DATA COMMUNICATIONS CABLING

BACKGROUND

Power over Ethernet (PoE) refers to delivery of power from power sourcing equipment (PSE) to powered devices (PDs) through Ethernet cabling. IEEE 802.3af and 802.at are standards which provide specific implementation details for such power delivery.

Examples of PSE include network switches and hubs. Examples of PDs include wireless access points, IP phones, and IP cameras.

Presently, there is no enforcement over how the PSE delivers power over the four twisted-wire pairs of an Ethernet cable (e.g., Cat 5, Cat 5e, Cat 6, etc.). Accordingly, it is currently possible for the PSE to deliver power to a PD over twisted-wire pairs of the cabling that do not carry data between the PSE and the PD. For example, through an Ethernet cable, it is possible for the PSE to exchange data with a PD only through first and second wire pairs of the Ethernet cable (e.g., 100 Mbps), and to deliver power only through the other twisted pairs, i.e., the remaining third and fourth twisted pairs of the Ethernet cable. It is also currently possible for the PSE to exchange data with a PD only through first and second twisted pairs of the Ethernet cable, and to deliver power through all of the twisted pairs of the Ethernet cable, i.e., power delivery to the PD using all four twisted pairs.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

It is possible for power sourcing equipment (PSE) to deliver power to a powered device (PD) over wire pairs that do not carry data between the PSE and the PD. Due to the lack of enforcement over which wire pairs are used for Power over Ethernet (PoE) power delivery, there are unfortunately associated drawbacks, e.g., the PD could operate improperly or suffer damage if the PSE attempts to inject power over the wrong or unanticipated wire pairs, there may be manufacturer imposed restrictions on which wire pairs are used for power delivery, etc.

Fortunately, improved techniques involve supplying power using only data-active pairs of data communications cabling, i.e., wire pairs which actively carry meaningful data between PSE and PD. In particular, electronic circuitry enforces power delivery from PSE to PD only over wire pairs that actively carry data with no power being delivered over wire pairs which do not carry data. Such enforcement is preferably ongoing so that, if the data rate between the PSE and PD changes over time (e.g. the PSE and PD may negotiate a new data rate), the electronic circuitry dynamically changes the particular wire pairs used for power delivery as well. As a result, the electronic circuitry continuously enforces delivery of power from the PSE to the PD using only data-active pairs.

One embodiment is directed to a power delivery method which involves connecting power sourcing equipment (PSE) with a powered device (PD) through data communications cabling (e.g., an Ethernet cable). The method further involves negotiating an acceptable power level for the PD and a data rate for the PD (e.g., 10 Mbps, 100 Mbps, 1 Gbps, etc.). The method further involves enforcing delivery of power to the PD using only wire pairs of the data communications cabling which carry data between the PSE and the PD. As a result, the PSE does not deliver any power to the PD through wire pairs which are not actively carrying data between the PSE and the PD (although these non data-active pairs may occasionally carry a test or discovery signal which is not considered meaningful data exchanged between the PSE and PD).

Description of Example Embodiments

Figure 1:
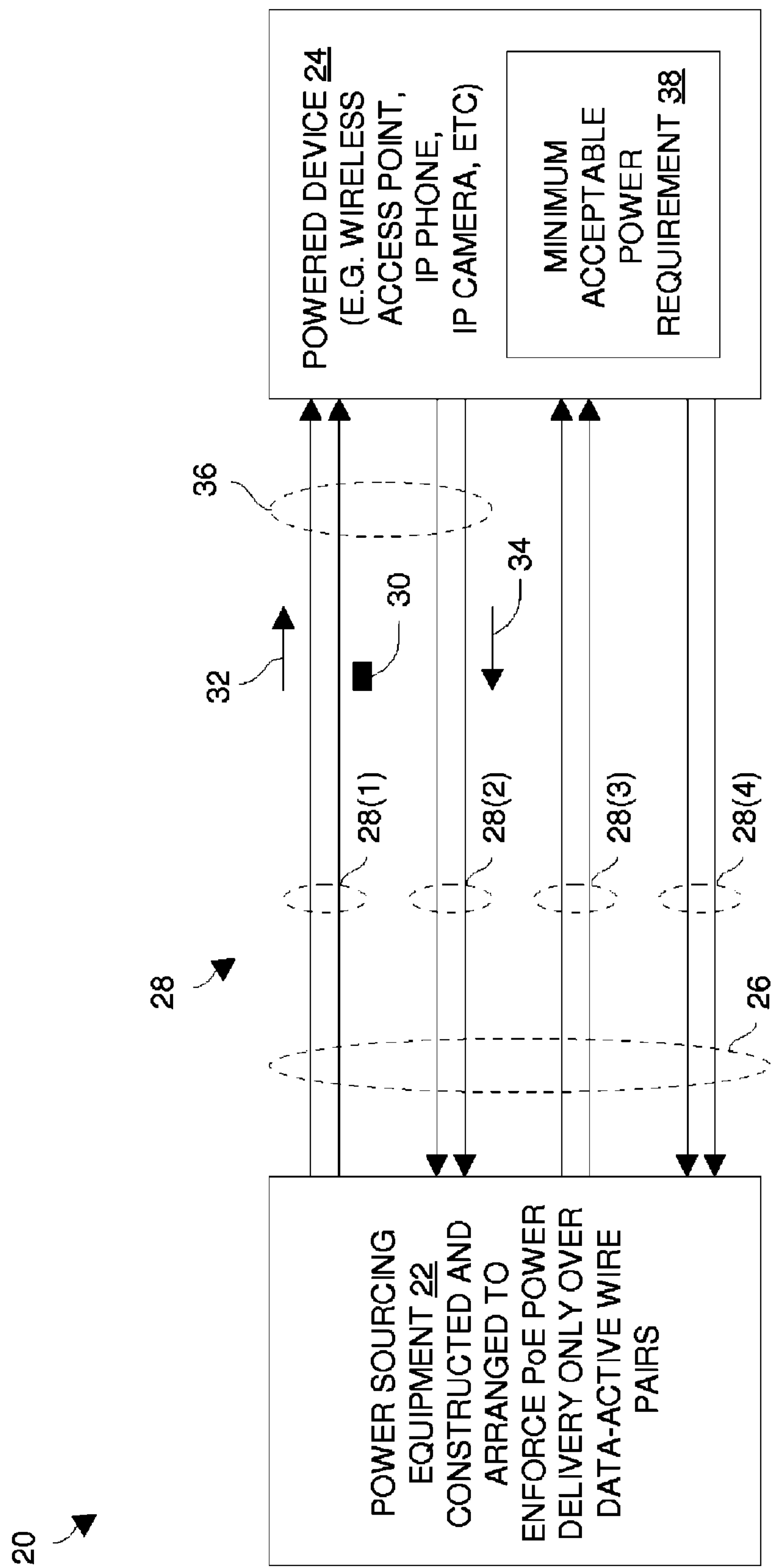
FIG. 1 is a block diagram of an electronic system which involves enforcement of delivery of power only through data-active pairs of data communications cabling.

FIG. 1 shows a block diagram of an electronic system 20 which enforces delivery of power only through data-active pairs of data communications cabling. The electronic system 20 includes PSE 22, a PD 24, and data communications cabling 26.

The data communications cabling 26 includes multiple twisted wire pairs 28(1), 28(2), 28(3), and 28(4) (collectively, parallel pairs of wires or simply wire pairs 28). Each wire pair 28 includes two end-to-end conductive paths (solid or stranded wires) for robust and reliable differential signaling to carry data 30 bi-directionally between the PSE 22 and the PD 24. Such data 30 refers to meaningful information exchanged between the PSE 22 and the PD 24 such as OSI Layer 3 or higher information (e.g., packetized application level data, voice data, etc.) in each direction. Along these lines, as illustrated by the arrow 32 associated with the wire pair 28(1), the PSE 22 is able to send data 30 to the PD 24. Likewise, as illustrated by the arrow 34 associated with the wire pair 28(2), the PD 24 is able to send data 30 to the PSE 22. Similarly, the PSE 22 and the PD 24 are able to exchange data 30 bi-directionally through the wire pairs 28(3), 28(4). Moreover, in the context of very high bandwidth (e.g., 1 Gbps), each pair 28 carries both transmit and receive data (i.e., the data is bidirectional).

Although the data communications cabling 26 is shown as a single, contiguous pathway between the PSE 22 and the PD 24 for simplicity, it should be understood that the data communications cabling 26 may include a variety of data communications components. Such components include cables, couplings, connectors, patch panels, combinations thereof, etc. which are capable of conveying data 30 as well as inline power.

As will be explained in further detail shortly, the PSE 22 is constructed and arranged to ensure that power delivery occurs only over data-active pairs of the data communications cabling 26. For example, the PSE 22 may deliver power to the PD 24 only over wire pairs 28(1), 28(2) if only wire pairs 28(1), 28(2) currently carry data 30 (i.e., the primary pair 36 illustrated by a dashed line around wire pairs 28(1), 28(2)). In this situation, the PSE 22 pre-empts power delivery over wire pairs 28(3), 28(4) if wire pairs 28(3), 28(4) do not carry data 30.

As another example, the PSE 22 may exchange data with the PD 24 over all four wire pairs 28. In this situation, the PSE 22 purposefully does not pre-empt delivery of power to the PD 24 over any wire pairs 28.

At this point, it should be understood that PSE 22 enforces power delivery only over data-active pairs 28 by imposing tight coupling between power negotiation and data rate negotiation (e.g., 10 Mbps, 100 Mbps, 1 Gbps, etc.). To this end and as shown in FIG. 1, the PD 24 has a minimum acceptable power requirement 38, and the PSE 22 and the PD 24 carry out 4-wire power negotiation prior to exchanging data 30. In particular, the PSE 22 and the PD 24 determine whether (i) the PD 24 requires power delivery over all four wire pairs 28 to satisfy the minimum acceptable power requirement 38 of the PD 24, or (ii) power delivery over two wire pairs 28 (e.g., use of only wire pairs 28(1) and 28(2)) satisfies the minimum acceptable power requirement 38 of the PD 24).

If the minimum acceptable power requirement 38 of the PD 24 requires power delivery over all four wire pairs 28, the PSE 22 permits power delivery using all four wire pairs 28 and sets the data rate between the PSE 22 and the PD 24 utilize all four wire pairs 28 as well (e.g., 1 Gbps). In this situation, all four wire pairs 28 are data-active (i.e., each wire pair 28 carries meaningful data 30 between the PSE 22 and the PD 24, and all four wire pairs 28 participate in power delivery.

Alternatively, if power delivery over two wire pairs 28 (e.g., wire pairs 28(1) and 28(2)) is able to satisfy the minimum acceptable power requirement 38 of the PD 24, the PSE 22 permits power delivery only through two wire pairs 28 (e.g., wire pairs 28(1), 28(2)) and sets the data rate between the PSE 22 and the PD 24 utilize only those data-active wire pairs 28 as well (e.g., 100 Mbps). In this situation, the remaining non data-active wire pairs 28 (e.g., wire pairs 28(3), 28(4)) are not involved in the delivery of power or data. It should nevertheless be understood that the remaining non data-active wire pairs 28 may still carry an occasional electrical signal to enable discovery/sensing, error detection, etc.

At this point, it should be understood that the PSE 22 and the PD 24 may dynamically re-negotiate power and/or data rate. For example, suppose that initially the wire pairs 28(1), 28(2) are data-active, and the wire pairs 28(3), 28(4) are not data-active. In this situation, the PSE 22 currently delivers PoE to the PD 24 using only the wire pairs 28(1), 28(2) due to the tight coupling existing between power delivery and data rate. Further suppose that the PD 24 notifies the PSE 22 that the PD 24 now requires increased power to the extent that all four wire pairs must be used to deliver power, or alternatively, suppose that the PD 24 informs the PSE 22 that the PD 22 requires a higher data rate that must be support by the use of all four wire pairs 28. In response, the PSE 22 is capable of simultaneously satisfying the request from the PD 24 by delivering power through all of the wire pairs 28 and increasing the data rate so that all of the wire pairs 28 are now data-active. Accordingly, the PD 24 enjoys dynamically increased power delivery and increased bandwidth while the PSE 22 maintains tight coupling between power delivery and data rate.

A similar exchange is possible between the PSE 22 and the PD 24 to reduce power delivery and the data rate. For example, suppose that the PSE 22 and the PD 24 utilize all four wire pairs 28 for power delivery and data exchange. Further suppose that the PSE 22 and the PD 24 now wish to coordinate a reduction of power and bandwidth. Here, the PSE 22 may pre-empt delivery of power through wire pairs 28(3), 28(4) and concurrently terminate data exchange through wire pairs 28(3), 28(4). Accordingly, the PSE 22 steadfastly delivers power only through data-active pairs 28.

It should be understood that the minimum acceptable power requirement 38 of the PD 24 is capable of being determined by a number of internal and external factors including need/pre-configuration/prioritization of the PD 24, capacity and loading of the system 20, etc. In some arrangements, the minimum acceptable power requirement 38 is a predefined value, and the PD 24 conveys the minimum acceptable power requirement 38 to the PSE 22 during a negotiation or exchange of operating parameters (e.g., during power negotiation shortly after discovery). In some arrangements, the minimum acceptable power requirement 38 is one of multiple predefined values based at least partially on the current state of operation of the PD 24 (e.g., sleep mode, low bandwidth mode, high bandwidth mode, etc.). In some arrangements, the PSE 22 dynamically monitors power draw over time and locally keeps track of the minimum acceptable power requirement 38 based on the power drawn by the PD 24.

It should be further understood that non data-active pairs 28 may carry an occasional electrical signal. That is, a wire pair 28 is considered to be "data-active" and thus carry data 30 between the PSE 22 and the PD 24 only if the data 30 is meaningful to the PD 24. If the data 30 through a particular wire pair 28 is not meaningful to the PD 24, there is no data communication between the PSE 22 and the PD 24 through that wire pair 28, and that wire pair is considered non data-active.

In some arrangements, the PSE 22 is capable of applying an electrical signal to the non data-active pairs 28. That is, the PSE 22 may transmit signals which are meaningless to the PD 24 on the non data-active pairs 28, i.e., electrical signals which are not received or not acted on by the PD 24. For instance, the PSE 22 may test whether there is a short or loop back at the PD 24 through non-data active pairs 28 even though there is no data communication occurring through those pairs 28. In such arrangements, the PSE 22 is nevertheless able to utilize the non data-active pairs 28 for exploratory, or error detection purposes, among other reasons. In these situations, the PSE 22 still pre-empts power delivery over non data-active pairs 28 of the data communications cabling 26. Further details will now be provided with reference to FIG. 2.

Figure 2:
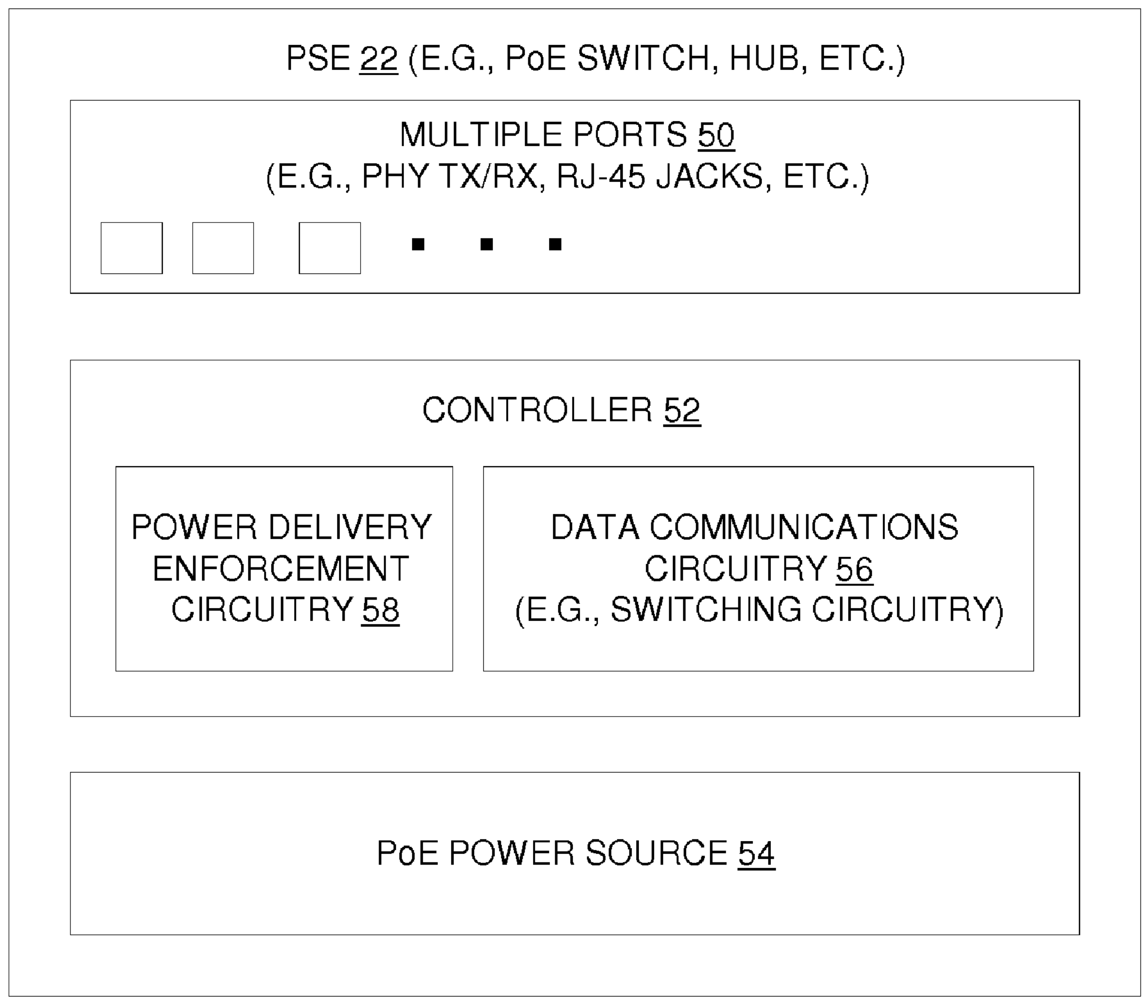
FIG. 2 is a block diagram of power sourcing equipment (PSE) of the electronic system of FIG. 1.

FIG. 2 shows particular details of the PSE 22. By way of example, the PSE 22 is illustrated as a PoE switch although the PSE 22 is well suited for other types of inline power delivery devices as well (a hub, etc.). As shown, the PSE 22 includes multiple ports 50, a controller 52, and a PoE power source 54. Each port 50 includes the electronics and physical components of a standard PoE switch, e.g., PHY transmit and receive circuitry, RJ45 (or 8P8C) jacks, etc. A particular port 50 connects to the PD 24 through the data communications cabling 26 (also see FIG. 1). The controller 52 includes power delivery enforcement circuitry 56 and data communications circuitry 58.

During operation, the controller 52 (i) negotiates an acceptable power level for the PD 24 and a data rate for the PD 24 through a particular port 50 and the data communications cabling 26, and (ii) enforces delivery of power from the power source 54 to the PD 24 using only wire pairs 28 of the data communications cabling 26 which carry data 30 between the port 50 and the PD 24. Such operation is carried out by the power delivery enforcement circuitry 58. In particular, the power delivery enforcement circuitry 58 sets registers within the PHY of the port 50 to allow it to link up at a high data rate (e.g., 1 Gbps) using all wire pairs 28 of the data communications cabling 26 or a low data rate using only primary wire pairs 28 (e.g., any data rate which uses only wire pairs 28(1), 28(2)).

Once power negotiation is complete and the data rate is set, the controller 52 performs traditional switching operations to route traffic over a local area network (LAN). In particular, the data communications circuitry 56 (e.g., switching circuitry) carries out packet switching among multiple computerized devices connected to the ports 50. In this context, the PD 24 is one of the computerized devices which communicates with the other with the other devices through the PSE 22. During such operation, the PSE 22 makes sure that power is always transmitted over only those wire pairs 28 that actively carry data 30.

In some arrangements, the power delivery enforcement circuitry 58 and the data communications circuitry 56 are discrete electronic circuits (e.g., ASICs, FPGAs, etc.) which are housed within a common PSE enclosure. In other arrangements, the power delivery enforcement circuitry 58 and the data communications circuitry 56 are implemented using a set of processors (i.e., one or more microprocessors) running software which performs the above-described power delivery enforcement and data communications tasks. In yet other arrangements, the power delivery enforcement circuitry 58 and the data communications circuitry 56 are implemented using a combination of discrete electronic circuits and processors. Further details will now be provided with reference to FIG. 3.

Figure 3:
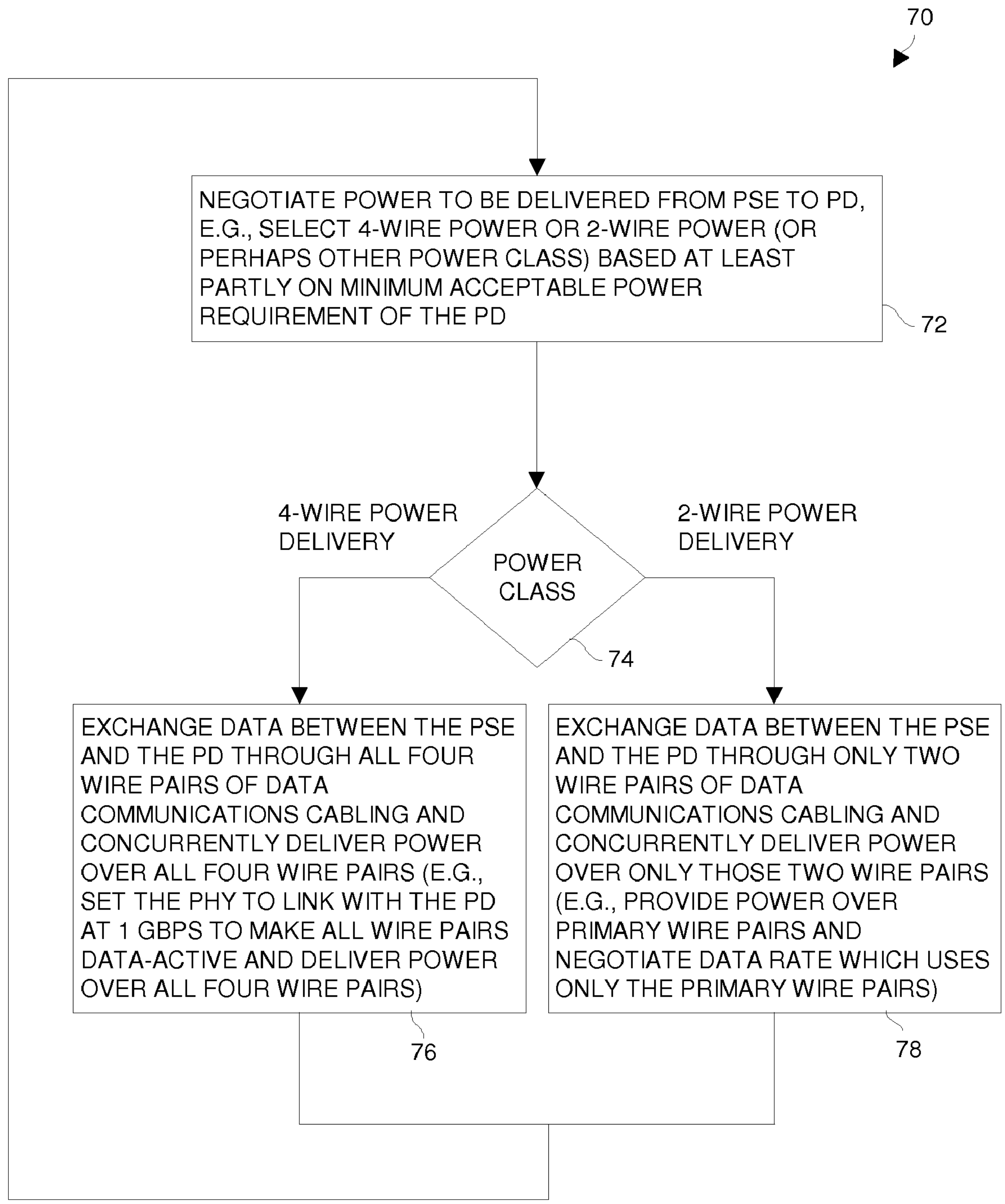
FIG. 3 is a flowchart of a procedure which is performed by the PSE of FIG. 2.

FIG. 3 shows a flowchart of a procedure 70 which is performed by the PSE 22 to deliver power to the PD 24 (also see FIGS. 1 and 2). In step 72, the PSE 22 carries out a power negotiation with the PD 24. In particular, the controller 52 of the PSE 22 selects between 4-wire power (i.e., power delivery through all four wire pairs 28 of the data communications cabling 26) and 2-wire power (i.e., power delivery through only two wire pairs 28 of the data communications cabling 26) based on the minimum acceptable power requirement 38 of the PD 24. For example, if the minimum acceptable power requirement 38 of the PD 24 equals or exceeds 12.95 W (i.e., the maximum power usage specified by IEEE 802.3af), the controller 52 selects 4-wire power (e.g., for up to 30 W of power under IEEE 802.3at). However, if the minimum acceptable power requirement 38 of the PD 24 is under 12.95 W, the controller 52 selects 2-wire power.

In step 74, the PSE 22 selects power delivery based on the outcome of step 72. If the controller 52 of the PSE 22 selects 4-wire power (e.g., because the PD 24 mandates the use of all four wire pairs 28), the procedure proceeds to step 76. However, if the controller 52 selects 2-wire power (e.g., because the minimum acceptable power requirement 38 of the PD 24 can be accommodated using only two wire pairs 28), the procedure proceeds to step 78.

In step 76, the PSE 22 exchanges data with the PD 24 through all four wire pairs 28 of the data communications cabling 26. In particular, the power delivery enforcement circuitry 58 sets registers in the PHY to only allow it to link up at a data rate that utilizes all four wire pairs 28 (e.g., 1 Gbps). Such operation forces all of the wire pairs of the data communications cabling 26 to be data-active. While the PSE 22 and the PD 24 now exchanging data 30 over all four wire pairs 28, the power delivery enforcement circuitry 58 concurrently delivers power to the PD 24 over all four wire pairs 28.

In step 78, the PSE 22 exchanges data with the PD 24 through only two wire pairs 28 of the data communications cabling 26. In particular, the power delivery enforcement circuitry 58 directs delivery of power to the PD 24 over only the primary wire pairs 28 of the data communications cabling 26 (e.g., wire pairs 28(1), 28(2)) and then negotiates a data rate which only uses the primary wire pairs 28. The PSE 22 and the PD 24 exchange data 30 only over the primary wire pairs 28, and the PSE 22 delivers power only over the primary wire pairs 28.

At this point, it should be understood that it is possible for the PSE 22 and the PD 24 to re-negotiate power over time. For example, some protocols permit event-driven or periodic re-negotiation of power delivery and/or data rate between the PSE 22 and the PD 24. Additionally, if the link between the PSE 22 and the PD 24 is ever lost, the PSE 22 and PD 24 are able to renegotiate power delivery and data rate by repeating the procedure 70. To illustrate this situation, both steps 76 and 78 of the procedure 70 are shown leading back to step 72.

It should be further understood that other power classes are suitable for use by the system 20 in addition to 4-wire and 2-wire power. For instance, in some arrangements, the PD 24 is capable of negotiating a data rate which uses all four wire pairs (i.e., 1 Gbps), but receives power only over two wire pairs 28 (e.g., wire pairs 28(1), 28(2)). The procedure 70 is able to accommodate these arrangements by including another branch from step 74 (e.g., branch based on power class). In this situation, there is still enforcement of power delivery over only data-active pairs 28, i.e., there are two other data-active pairs 28 that do not deliver power (e.g., wire pairs 28(3), 28(4)). Further details will now be provided with reference to FIG. 4.

Figure 4:
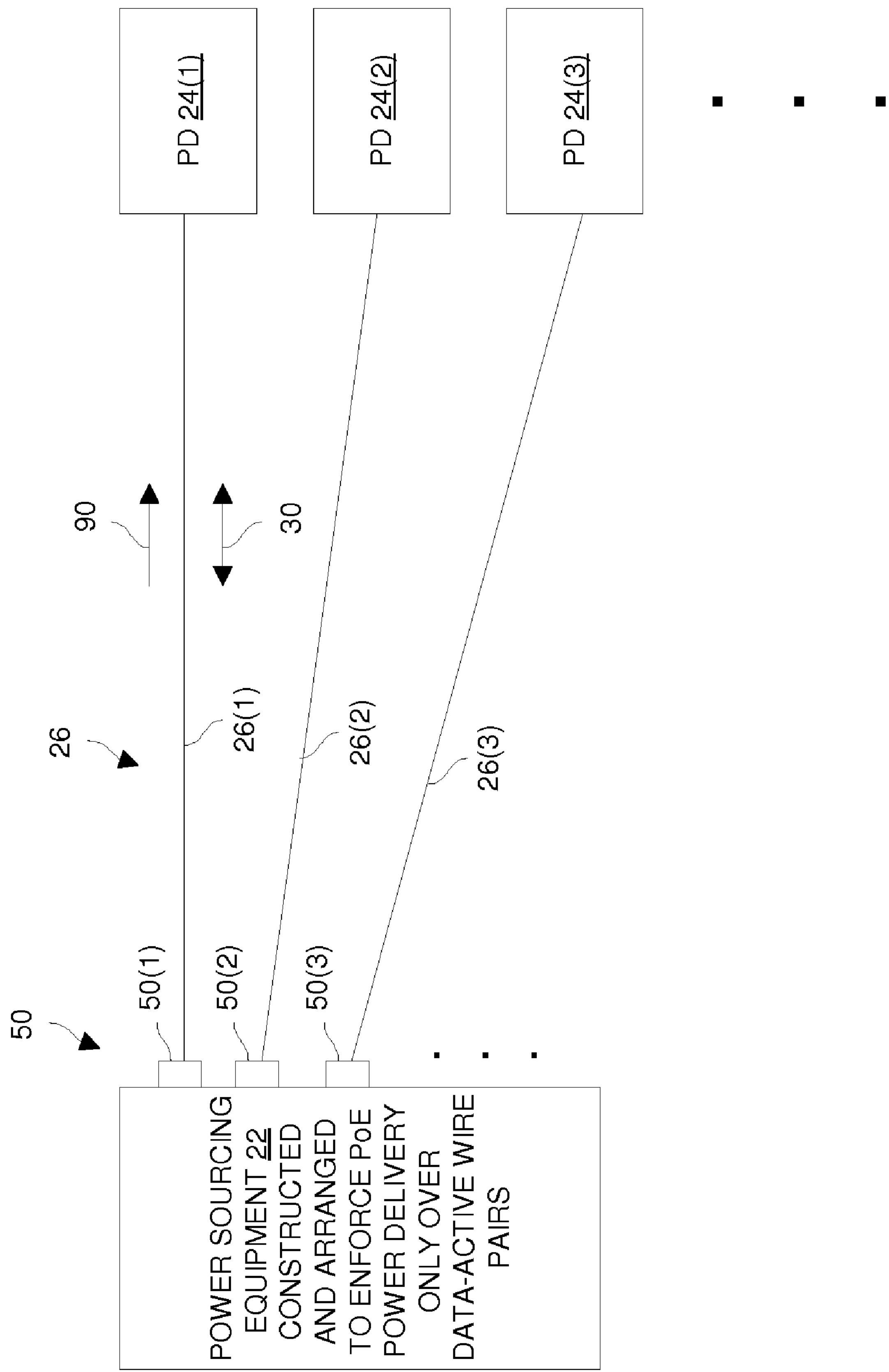
FIG. 4 is a block diagram of the electronic system when the PSE is implemented as a multi-port networking device which enforces delivery of power to multiple powered devices (PDs) using only data-active pairs of respective data communications cabling leading to the PDs.

FIG. 4 is a block diagram of the electronic system 20 when the system 20 includes multiple PDs 24(1), 24(2), 24(3), . . . (collectively, PDs 24). As shown, each PD 24 couples to a respective port 50 of the PSE 22 through respective data storage cabling 26 to receive power 90 from the PSE 22 and to exchange data 30 with the PSE 22. In particular, the PD 24(1) couples to port 50(1) through data communications cabling 26(1). Similarly, the PD 24(2) couples to port 50(2) through data communications cabling 26(2), and so on.

The particular configuration for the electronic system 20 shown in FIG. 4 is well suited for a variety of purposes such as a network of distributed wireless access points, a Voice over IP phone system, an IP camera surveillance system, and the like. In such configurations, the power source 54 (FIG. 2) has a power budget based on its internal power capacity and the capacity of the main power feed (e.g., street power). The controller 54 allocates power from the power source 54 to the various PDs 24 during power negotiation, and then delivers power to the various PDs 24 only over data-active pairs of the data communications cabling 26.

For the configuration of FIG. 4, the PSE 22 individually performs the procedure 70 (FIG. 3) for each PD 24. It should be understood that is possible for one PD 24 to receive a first amount of power 90 from the PSE 22 and have a first data rate with the PSE 22, and for another PD 24 to receive a different amount of power 90 from the PSE 22 and have a different data rate with the PSE 22. For example, suppose that the PD 24(1) has a relatively low minimum acceptable power requirement 38 and requires a relatively low bandwidth while the PD 24(2) has a relatively high minimum acceptable power requirement 38 and requires a relatively high bandwidth. In this situation, the PSE 22 is capable of enforcing delivery of power 90 to the PD 24(1) only over two data-active pairs 28 of the data communications cable 28(1) (e.g., 100 Mbps), while concurrently enforcing delivery of power 90 to the PD 24(2) over four data-active pairs 28 of the data communications cable 28(2) (e.g., 1 Gbps). Such a situation demonstrates the flexibility of the PSE 22 and ability of the PSE 22 to accommodate different power requirements by performing the procedure 70 (FIG. 3) for each port 50.

As mentioned above, improved techniques involve supplying power 90 using only data-active pairs of data communications cabling 26, i.e., wire pairs 28 which actively carry meaningful data between PSE 22 and a PD 24. In particular, electronic circuitry enforces power delivery from PSE 22 to PD 24 only over wire pairs 28 that actively carry data 30 with no power being delivered over wire pairs 28 which do not carry data 30. Such enforcement is preferably ongoing so that, if the data rate between the PSE 22 and the PD 24 changes over time (e.g. the PSE 22 and the PD 24 may negotiate a new data rate), the electronic circuitry dynamically changes the particular wire pairs 28 used for power delivery as well. As a result, the electronic circuitry continuously enforces delivery of power 90 from the PSE 22 to the PD 24 using only data-active pairs 28.

While various embodiments of the invention have been particularly shown and described, it will be understood by those skilled in the art that various changes in form and details may be made therein without departing from the spirit and scope of the invention as defined by the appended claims.

What is claimed is:

1. A method, comprising:

connecting power sourcing equipment (PSE) with a powered device (PD) through data communications cabling;

negotiating an acceptable power level for the PD and a data rate for the PD; and enforcing delivery of power to the PD using only wire pairs of the data communications cabling which carry data between the PSE and the PD, wherein the data communications cabling includes a first pair of wires, a second pair of wires, a third pair of wires, and a fourth pair of wires;

wherein enforcing delivery of power to the PD using only the wire pairs of the data communications cabling which carry data between the PSE and the PD includes:

delivering power to the PD using the first, second, third, and fourth pairs of wires when each of the first, second, third, and fourth pairs of wires carry data between the PSE and the PD, and delivering power to the PD using the first and second pairs of wires and not delivering power to the PD using the third and fourth pairs of wires when each of the first and second pairs of wires carry data between the PSE and the PD and the third and fourth pairs of wires do not carry data between the PSE and the PD, wherein negotiating the acceptable power level for the PD and the data rate for the PD includes establishing the acceptable power level for the PD based on a minimum acceptable power requirement of the PD, and wherein negotiating the acceptable power level for the PD and the data rate for the PD further includes, after establishing the acceptable power level for the PD based on the minimum acceptable power requirement of the PD, establishing the data rate for the PD based on the acceptable power level for the PD.

2. A method as in claim 1 wherein establishing the data rate for the PD based on the acceptable power level for the PD includes:

setting the data rate to be a high speed for data exchanged between the PSE and the PD when the minimum acceptable power requirement of the PD requires using the first, second, third, and fourth pairs of wires to satisfy the minimum acceptable power requirement of the PD, and setting the data rate to be a low speed for data exchanged between the PSE and the PD when the minimum acceptable power requirement of the PD requires using only two pairs of wires to satisfy the minimum acceptable power requirement of the PD, the low speed being a slower data transfer rate than the high speed.

3. A method as in claim 1 wherein establishing the data rate for the PD based on the acceptable power level for the PD includes:

setting the data rate to be substantially 1 Gigabit per second when the acceptable power level for the PD requires using the first, second, third, and fourth pairs of wires to satisfy the minimum acceptable power requirement of the PD.

4. A method as in claim 3, further comprising:

after a period of operation in which the data rate is substantially 1 Gigabit per second and in response to the PSE and the PD negotiating a new data rate of substantially 100 Megabits per second through the first and second pairs of wires and with no data transfer through the third and fourth pairs of wires, pre-empting delivery of power to the PD by avoiding use of the third and fourth pairs of wires for power delivery to the PD.

5. A method as in claim 1 wherein establishing the data rate for the PD based on the acceptable power level for the PD includes:

setting the data rate to be substantially 100 Megabits per second when the acceptable power level for the PD requires using only two pairs of wires satisfy the minimum acceptable power requirement of the PD.

6. A method as in claim 5, further comprising:

after a period of operation in which the data rate is substantially 100 Megabits per second and in response to the PSE and the PD negotiating a new data rate of substantially 1 Gigabit per second through the first, second, third, and fourth pairs of wires, enabling delivery of power to the PD using the first, second, third, and fourth pairs of wires.

7. A method as in claim 1 wherein the PSE is a Power over Ethernet (PoE) switching device; and wherein the method further comprises:

delivering power from the PSE to other powered devices through respective other data communications cabling leading to the other powered devices, the PoE switching device enforcing delivery of power to the other PDs using only wire pairs of the respective other data communications cabling which carry data between the PSE and the other PDs.

8. A method as in claim 1, wherein negotiating an acceptable power level for the PD and a data rate for the PD includes:

assigning a number of wire pairs for conveying power to the PD based on the minimum acceptable power requirement of the PD, and setting a data rate for communicating with the PD based on the number of wire pairs assigned.

9. A method as in claim 8, further comprising dynamically changing the assigned number of wire pairs for conveying power to the PD in response to an indication from the PD that higher data rate is needed.

10. A method as in claim 1, further comprising determining the minimum acceptable power requirement of the PD based on monitoring of actual power draw from of the PD.

11. A method as in claim 1, wherein enforcing delivery of power to the PD using only wire pairs of the data communications cabling which carry data between the PSE and the PD includes:

identifying a set of wire pairs between the PSE and the PD that are used for data communication; and transmitting, in response to the identifying, power to the PD using only the identified set of wire pairs without providing power to the PD using any other set of wire pairs.

12. An electronic device, comprising:

a port arranged to connect with a powered device (PD) through data communications cabling;

a power source; and a controller coupled to the port and to the power source, the controller being arranged to (i) negotiate an acceptable power level for the PD and a data rate for the PD through the port and the data communications cabling, and (ii) enforce delivery of power from the power source to the PD using only wire pairs of the data communications cabling which carry data between the port and the PD, wherein the data communications cabling includes a first pair of wires, a second pair of wires, a third pair of wires, and a fourth pair of wires, wherein the controller, when enforcing delivery of power to the PD using only the wire pairs of the data communications cabling which carry data between the electronic device and the PD, is arranged to:

deliver power from the power source to the PD using the first, second, third, and fourth pairs of wires when each of the first, second, third, and fourth pairs of wires carry data between the electronic device and the PD, and deliver power from the power source to the PD using the first and second pairs of wires and not delivering power to the PD using the third and fourth pairs of wires when each of the first and second pairs of wires carry data between the electronic device and the PD and the third and fourth pairs of wires do not carry data between the electronic device and the PD, wherein the controller, when negotiating the acceptable power level for the PD and the data rate for the PD, is arranged to establish the acceptable power level for the PD based on a minimum acceptable power requirement of the PD, and wherein the controller, when negotiating the acceptable power level for the PD and the data rate for the PD, is further arranged to establish the data rate for the PD based on the acceptable power level for the PD, after establishing the acceptable power level for the PD based on the minimum acceptable power requirement of the PD.

13. An electronic device as in claim 12 wherein the controller, when establishing the data rate for the PD based on the acceptable power level for the PD, is arranged to:

set the data rate to be a high speed for data exchanged between the electronic device and the PD when the minimum acceptable power requirement of the PD requires using the first, second, third, and fourth pairs of wires to satisfy the minimum acceptable power requirement of the PD, and set the data rate to be a low speed for data exchanged between the electronic device and the PD when the minimum acceptable power requirement of the PD requires using only two pairs of wires to satisfy the minimum acceptable power requirement of the PD, the low speed being a slower data transfer rate than the high speed.

14. An electronic device as in claim 12 wherein the controller, when establishing the data rate for the PD based on the acceptable power level for the PD, is arranged to:

set the data rate to be substantially 1 Gigabit per second when the acceptable power level for the PD requires using the first, second, third, and fourth pairs of wires to satisfy the minimum acceptable power requirement of the PD.

15. An electronic device as in claim 14 wherein the controller is further arranged to:

pre-empt delivery of power to the PD by avoiding use of the third and fourth pairs of wires for power delivery to the PD, after a period of operation in which the data rate is substantially 1 Gigabit per second and in response to the controller and the PD negotiating a new data rate of substantially 100 Megabits per second through the first and second pairs of wires and with no data transfer through the third and fourth pairs of wires.

16. An electronic device as in claim 12 wherein the controller, when establishing the data rate for the PD based on the acceptable power level for the PD, is arranged to:

set the data rate to be substantially 100 Megabits per second when the acceptable power level for the PD requires using only two pairs of wires satisfy the minimum acceptable power requirement of the PD.

17. An electronic device as in claim 16 wherein the controller is further arranged to:

enable delivery of power to the PD using the first, second, third, and fourth pairs of wires, (i) after a period of operation in which the data rate is substantially 100 Megabits per second and (ii) in response to the controller and the PD negotiating a new data rate of substantially 1 Gigabit per second through the first, second, third, and fourth pairs of wires.

18. An electronic device as in claim 12, further comprising:

data communications switching circuitry thus enabling the electronic device to operate as a Power over Ethernet (PoE) switching device; and wherein the controller is further arranged to deliver power from the PSE to other powered devices through respective other data communications cabling leading to the other powered devices, the controller enforcing delivery of power to the other PDs using only wire pairs of the respective other data communications cabling which carry data between the electronic device and the other PDs.

* * * * *